US006909976B2

(12) United States Patent
Kitamaru et al.

(10) Patent No.: US 6,909,976 B2
(45) Date of Patent: Jun. 21, 2005

(54) METHOD FOR CALCULATING THRESHOLD VOLTAGE OF POCKET IMPLANT MOSFET

(75) Inventors: Daisuke Kitamaru, Hiroshima (JP); Michiko Miura, Hiroshima (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 148 days.

(21) Appl. No.: 10/231,117

(22) Filed: Aug. 30, 2002

(65) Prior Publication Data

US 2003/0082839 A1 May 1, 2003

(30) Foreign Application Priority Data

Aug. 31, 2001 (JP) ........................................ 2001-263752

(51) Int. Cl.$^7$ .............................................. G01R 19/00
(52) U.S. Cl. ............................ 702/64; 702/193; 703/14
(58) Field of Search ............................... 702/57, 64–65, 702/117, 189, 193; 703/3–4, 13–14; 716/4–5; 438/17, 300–302

(56) References Cited

U.S. PATENT DOCUMENTS

| | | | | |
|---|---|---|---|---|
| 4,506,436 A | * | 3/1985 | Bakeman et al. | ............ 438/449 |
| 6,304,834 B1 | * | 10/2001 | Enda | .............................. 703/4 |
| 6,581,028 B1 | * | 6/2003 | Hayashi | ........................ 703/13 |
| 6,594,625 B2 | * | 7/2003 | Hayashi | .......................... 703/2 |
| 6,690,060 B2 | * | 2/2004 | Horiuchi et al. | ............. 257/327 |
| 6,697,771 B1 | * | 2/2004 | Kondo et al. | .................... 703/2 |
| 6,709,959 B2 | * | 3/2004 | Kase et al. | .................. 438/530 |
| 2003/0122164 A1 | * | 7/2003 | Komatsu | ..................... 257/219 |

FOREIGN PATENT DOCUMENTS

JP            10-22502 A      1/1998

OTHER PUBLICATIONS

Subramanian et al., "Reverse short channel effect and channel length dependence of boron penetration in PMOSFETs", Dec. 1995, Electron Devices Meeting, 1995., International, pp. 423–426.*

Hu et al, 2001 Symposium on VLSI Circuits Digest of Technical Papers, pp. 5–6 (2001).

Miura–Mattausch et al, IEEE Transactions on Computer–Aided Design of Integrated Circuits and Systems, vol. 15, No. 1, pp. 1–7 (1996).

Suetake et al, Precise Physical Modeling of the Reverse–Short–Channel Effect for Circuit Simulation, pp. 207–209 (1999).

Kitamaru et al, Proc. 2002 International Conference on Simulation of Semiconductor Processing and Devices, pp. 392–395 (2002).

Mirua–Mattausch et al, IEEE Transactions on Electron Devices, vol. 48, No. 10, pp. 2449–2452 (2001).

Mattausch et al, 2002 American Institute of Physics, vol. 80, No. 16, pp. 2994–2996 (2002).

* cited by examiner

Primary Examiner—Marc S. Hoff
Assistant Examiner—Mary Catherine Baran
(74) Attorney, Agent, or Firm—Birch, Stewart, Kolasch & Birch, LLP

(57) ABSTRACT

A threshold voltage model with an impurity concentration profile in a channel direction taken into account is provided in the pocket implant MOSFET. With penetration length of the implanted pocket in the channel direction and the maximum impurity concentration of the implant pocket used as physical parameters, the threshold voltage model is obtained by linearly approximating the profile in the channel direction. By analytically solving the model by using a new threshold condition with inhomogeneous profile taken into account, the threshold voltage can be accurately obtained. Based on thus obtained model, the threshold voltage can be predicted and can be used for circuit design.

10 Claims, 3 Drawing Sheets

POSITION IN THE
CHANNEL DIRECTION [μm]

METHOD FOR CALCULATING THRESHOLD VOLTAGE OF POCKET IMPLANT MOSFET

BACKGROUND OF THE INVENTION

1. Field of the Invention

The present invention relates to a threshold voltage model of pocket implant MOSFET and applications thereof.

2. Description of the Prior Art

It is essential to effectively suppress short-channel effect in order to miniaturize Metal Oxide Semiconductor Field-Effect Transistor (herein referred to as "MOSFET" for both n-channel and p-channel), and therefore, the pocket implant technology is popularly used. This pocket implant generates concentration profile with a peak located at a place deep below a source end and a drain end of a channel by implanting impurities of the type same as substrate impurities with gate used as a mask. Because regions with high impurity concentration formed at the source end and the drain end of the channel in this way absorb electric field induced in the channel direction and, in addition, a threshold voltage rises as gate length decreases, they can suppress reduction of the threshold voltage. Furthermore, because the concentration peak is located at the deep place, it is an advantage that carrier mobility could be less lowered than in the case a substrate with homogeneous high impurity concentration is used.

The pocket implant described above is the technique that could be a key to miniaturization of MOSFET However, there has been no technique for easily analyzing the concentration profile of the implanted impurities. Consequently, in the pocket implant MOSFET, the dependence of threshold voltage on the drain voltage, channel length, etc. is unable to be accurately predicted and is a bottleneck in designing circuits.

Presently, Berkeley Short IGFET Model, Version-3, 4 (BSIM3, 4) is proposed as a MOSFET model and is served for use in the industry. In this BSIM3, 4, efforts are made to reproduce the measurability by introducing parameters whose physical meanings are undefined so as to apply the model to the pocket implant MOSFET However, this model basically assumes that impurity concentration of the substrate is homogeneous, and furthermore, assumes that the reverse density of electric charge in an inversion layer is zero. Thus, it is essentially constrained to apply the model to the pocket implant MOSFET which has inhomogeneous impurity concentration distribution in the channel direction.

SUMMARY OF THE INVENTION

Accordingly, it is the primary object of the present invention to provide a MOSFET model with the inhomogeneous concentration distribution taken into account for the pocket implant MOSFET and to identify the relationship between the threshold voltage and a pocket profile by using this model.

It is still a more specific object of the present invention to provide a threshold voltage model which can be defined by using definite physical quantities and which comparatively easily provides a threshold voltage satisfactorily close to an actually measured threshold voltage.

It is another object of the present invention to newly define conditions of the threshold voltage required for model analysis because the impurity concentration profile is inhomogeneous in the channel direction by the threshold voltage model in the present invention.

It is a further object of the present invention to provide a threshold voltage model that can be applicable to circuit simulation by further simplifying the threshold voltage model according to the present invention.

It is still a further object of the present invention to provide a method for estimating a pocket profile in the depth direction of substrate based on a relationship between the threshold voltage obtained by the use of the threshold voltage model according to the present invention and the actually measured threshold voltage.

The threshold voltage model of the pocket implant MOSFET according to the present invention is obtained by using penetration length of a pocket penetrating into a substrate in a channel direction and maximum impurity concentration in the pocket as parameters to linearly approximate a profile of impurity concentration within the substrate in the channel direction.

In analyzing this threshold voltage model, the model is passably assumed to have no dependence in the substrate depth direction. However, It is possible to estimate impurity concentration profile in the depth direction by using obtained threshold voltage.

In addition, for the analytical solution of this threshold voltage model, it is necessary to define a new threshold value condition, since threshold value conditions conventionally known are obtained on the assumption that the concentration in the channel direction is constant. Consequently, in the present invention, threshold voltage is determined to be a gate voltage at the time density of electric charges in an inversion layer reaches a predetermined threshold value, and a threshold condition is defined in which a value obtained by integrating the density of electric charges in the inversion layer over a whole channel area provides the threshold voltage.

By analytically solving the threshold voltage model of the threshold voltage by using the threshold condition, the threshold voltage can be obtained, which satisfactorily approximates to an actually measured threshold voltage.

Because the analytically obtained threshold voltage is expressed by a significantly complicated equation, it is not suitable to apply it to the circuit simulation. However, this problem can be solved by assuming several conditions in analysis. For example, in another threshold voltage model of the present invention, an average value of concentration obtained from a concentration profile in the pocket is used. Based on the average value, remarkable simplification can be achieved, and the model becomes suitable for circuit simulation.

The concentration profile in a depth direction of the substrate can be obtained by performing parameter fitting using parameters, obtained threshold voltage and a threshold voltage actually measured.

As a result, the concentration profile of the implant pocket can be estimated both in the channel direction and in the depth direction.

BRIEF DESCRIPTION OF THE DRAWINGS

These and other object and features of the present invention will become clear from the following description taken in conjunction with the preferred embodiments thereof with reference to the accompanying drawings, in which.

DETAILED DESCRIPTION OF THE PREFERRED EMBODIMENTS

With respect to preferred embodiments of, the present invention will be described.

(1) Threshold Voltage Model

Figure 1:
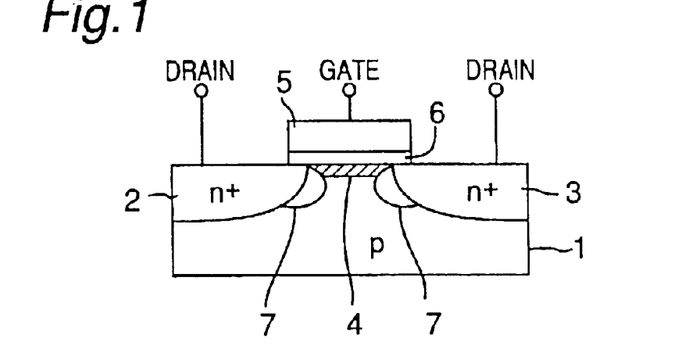
FIG. 1 is a cross-sectional view of a structure of pocket implant MOSFET.

FIG. 1 shows a construction of pocket implant n-MOSFET MOSFET has source 2, drain 3, channel 4 formed between source 2 and drain 3, gate electrode 5 which controls channel 4, and gate oxide film 6 formed between channel 4 and gate electrode 5, that are respectively formed on the substrate 1. MOSFET has pocket implant areas 7 formed below channel 4 by implanting impurities of the same type implanted to the source 2 and drain 3 obliquely from the source 2 side and the drain 3 side of the gate electrode 5.

Figure 2:
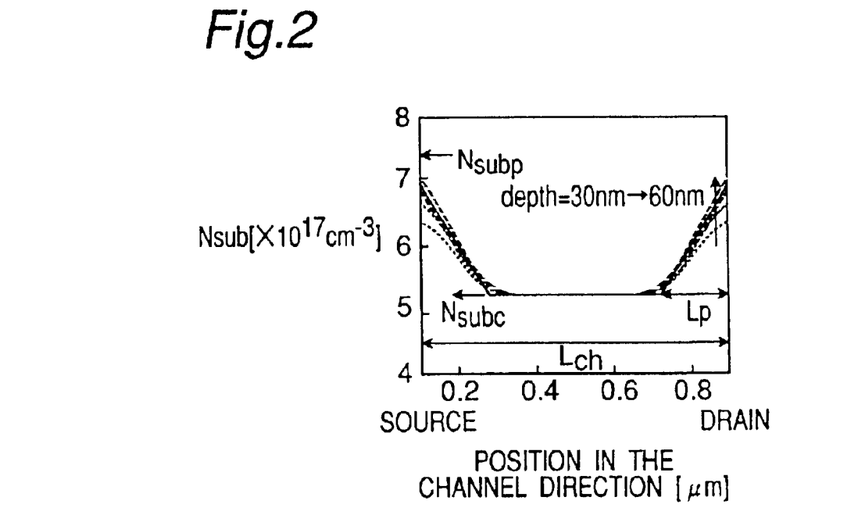
FIG. 2 is an impurity concentration profile of a threshold voltage model according to the present invention.

As shown with the solid line of FIG. 2, the impurity concentration profile below channel 4 of the pocket implant MOSFET is linearly approximated and designated as the threshold voltage model. In FIG. 2, $L_{ch}$ denotes the channel length, $L_p$ the penetration length of pocket implant area 7 in the channel direction, $N_{subc}$ the impurity concentration of the non-pocket implant area, that is, the impurity concentration of substrate 1, and $N_{subp}$ the peak value of the impurity concentration of pocket implant area 7. That is, this threshold voltage model is a concentration profile in the polygonal form which linearly increases to channel ends from both ends of the center area (non-pocket-implant area) with homogeneous impurity concentration ($N_{subc}$) and leads respectively to the peak value ($N_{subp}$). In other words, in the present threshold voltage model, the impurity concentration profile at the pocket implant area is described by two physical quantities, the penetration length $L_p$ and the concentration peak value $N_{subp}$.

Note that, in FIG. 2, dotted lines represent impurity concentration profiles obtained from two-dimensional process simulation so that they reproduce the actually measured threshold values, to which the present threshold voltage model satisfactorily approximates as later verified.

(2) Threshold Value Conditions

Figure 3:
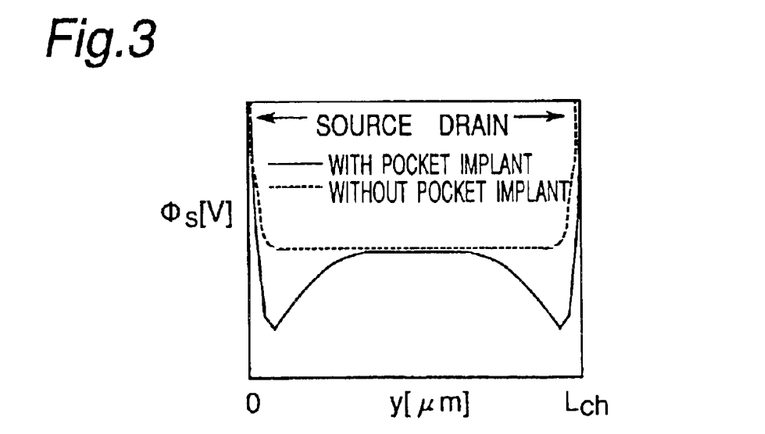
FIG. 3 is a diagram of difference between surface potential $\phi_s$ with pocket implant and that without pocket implant.

FIG. 3 shows changes of $\phi_s$ in the channel, which is a difference between potential at the substrate and potential at the channel surface, for each case with pocket implant (solid line) and without pocket implant (dotted line). In the case without pocket implant, $\phi_s$ is nearly constant, whereas in the case with pocket implant, $\phi_s$ has minimum values in the vicinity of both ends of the channel, and $\phi_s$ is not constant, that is, charge density in the channel is not constant.

Figure 4:
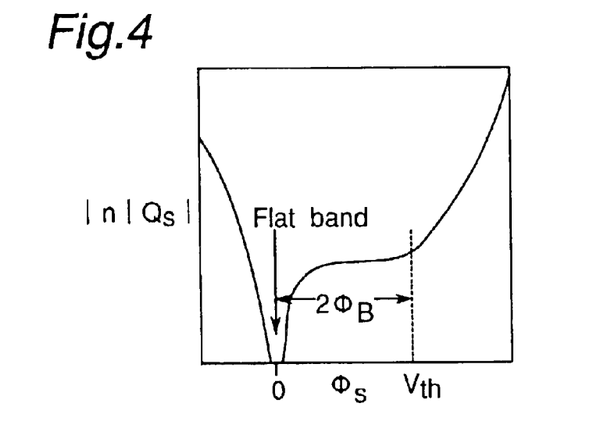
FIG. 4 is a graph of a relationship between $\phi_s$ and $Q_s$.

In the case $\phi_s$ is constant (i.e. without pocket implant), because the distribution in the channel direction can be ignored, a relationship between $\phi_s$ and $Q_s$, which represents electric charge per unit area collected on the semiconductor side, can be analytically obtained, as shown in FIG. 4.

In the range of $0<\phi_s<2\phi_B$, the vicinity of the semiconductor surface is depleted. Therefore, $Q_s$ is determined primarily by a width of the depletion layer and the impurity concentration. At $\phi_s>2\phi_B$, concentration of electrons on the channel surface becomes higher than the impurity concentration. Thus, $Q_s$ is primarily determined by the electrons.

A condition which gives a boundary to these two ranges:

$$\phi_s = 2\phi_B \qquad [\text{Eq. 1}]$$

is generally extensively used as the threshold value conditions, where $\phi_B$ denotes $(1/\beta)\ln(N_{sub}/n_i)$ and is the difference between the intrinsic Fermi level and the Fermi level (note that, $n_i$ denotes intrinsic carrier density).

Using this threshold value condition and several assumptions, the threshold voltage $V_{th}$ is found as follow:

$$V_{th} = 2\phi_B + V_{fb} + \frac{\sqrt{2qN_{sub}\varepsilon_{si}(2\phi_B - V_{bs})}}{C_{0x}} \qquad [\text{Eq. 2}]$$

where, $\varepsilon_{si}$ denotes dielectric constant of semiconductor and $C_{ox}$ denotes gate oxide film capacitance.

As described above, when $\phi_s$, is constant, that is, when a density profile is constant, threshold voltage $V_{th}$ can be comparatively easily obtained from the threshold value condition of Eq. 1.

However, when the concentration profile is set as shown in FIG. 1 such as the present invention, the above threshold value condition cannot be used as it is. That is, one or more new threshold value conditions must be defined.

In this part of the section, a new threshold value condition will be defined from current density equation. The reason why the current density equation is used is that the threshold voltage $V_{th}$ should be determined based on the $I_{ds}$–$V_{gs}$ characteristics.

Now, the current density equation in the channel direction, that is, in the y direction, can be expressed by the [Eq. 3] as follows for the n-channel. Note that for the p-channel, the same treatment is possible.

$$j_n = -q\mu_n n \frac{d\phi}{dy} + qD_n \frac{dn}{dy} \qquad [\text{Eq. 3}]$$

By utilizing Einstein's formula, this equation is represented by the quasi-Fermi level $\phi_f$ as follows:

$$j_n = -q\mu_n n \frac{d\phi_f}{dy} \qquad [\text{Eq. 4}]$$

In Eqs. 3 and 4, $j_n$ denotes electron current density per unit area, $\mu_n$, electron mobility, n electron concentration per unit volume on the semiconductor surface, $\phi$ potential difference from bulk, and $D_n$ diffusion constant of electron.

When Eq. 4 is integrated in the depth direction (x direction), channel width direction (z direction), and channel length direction (y direction) and the relation of $\phi_f(L_{ch})-\phi_f(0)=V_{ds}$ is used with affection of hole current to drain current be ignored, the drain current $I_{ds}$ can be expressed by the following equation:

$$I_{ds} = qW\mu_n \frac{L_{ch}}{\int_0^{L_{ch}} n_x^{-1} dy} \frac{V_{ds}}{L_{ch}} \quad [\text{Eq. 5}]$$

where, $n_x$ is a value obtained by integrating n in the depth direction and is an electron density per unit area. In this equation, since $n_x$ greatly depends on $V_{gs}$, parts related to $n_x$ are extracted from Eq. 5 and is designated as $n_{xav}$, which is defined as follows:

$$n_{xav}^{-1} \equiv \frac{\int_0^{L_{ch}} n_x^{-1} dy}{L_{ch}}. \quad [\text{Eq. 6}]$$

$n_{xav}$ is a reciprocal of a mean value in the channel of the reciprocal of numbers of inversion layer electrons, and expresses a state of inversed channel. In the present invention, threshold value states are determined by using $n_{xav}$ and $$n_{xav} = n_{xth} \quad [\text{Eq. 7}]$$

is defined as a threshold value condition. $n_{xth}$ is an electron density that gives the threshold value, and is able to be obtained by applying the threshold value condition $\phi_s = 2\phi_B$ [Eq. 1] of the case without pocket implant. This is because that a condition itself that gives the threshold voltage $V_{th}$ is considered unchanged, although a value of the threshold voltage $V_{th}$ obtained is changed by using a mean value of $n_{xav}$ in place of the constant electron density $n_x = n_{xc}$ in the case without pocket implant.

Figure 5:
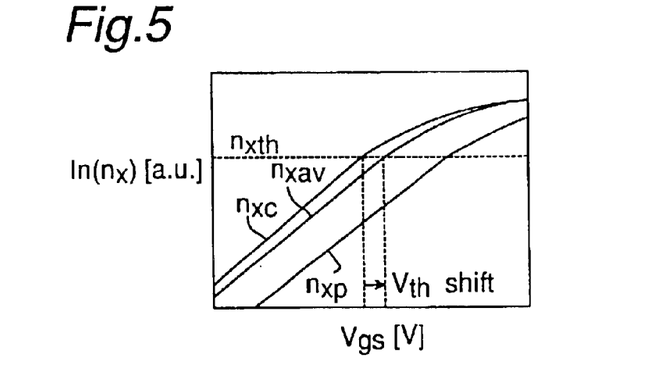
FIG. 5 is a graph of a relationship between $n_x$ and $V_{gs}$.

FIG. 5 shows the explanation. $n_{xc}$ denotes $n_x$ of non-pocket-implant area, and $n_{xp}$ denotes $n_x$ of the place at the highest concentration in the pocket implant area. Because devices without pocket implant has constant $n_{xc}$ in the channel, $n_{xav}$ coincides with $n_{xc}$. On the other hand, since, for devices with pocket implant, $n_{xp}$ is less than $n_{xc}$ at the same $V_{gs}$, $n_{xav}$ becomes less than $n_{xc}$. In turn, $V_{gs}$ necessary for satisfying $n_{xav} = n_{xth}$ becomes large, and this causes $V_{th}$ $V_{th}$ to be increased.

(3) Modeling

In order to derive the threshold voltage $V_{th}$ using the profile model according to the present invention shown in FIG. 2, three steps will be executed.

First step: Express $n_{xav}$ as a function of gate voltage $V_{gs}$
Second step: Obtain $V_{gs}$ that gives $n_{xav}$
Third step: Derive a new threshold voltage equation with $n_{xav} = n_{xth}$ applied First Step:

In Eq. 6 which defines $n_{xav}$, by approximating $n_x$ as $n_{xc}$ in the non-pocket-implant area, $n_{xav}$ is expressed by:

$$n_{xav} = \frac{L_{ch}}{\frac{L_{ch} - 2L_p}{n_{xc}} + \frac{2L_p}{n'_{xp}}} \quad [\text{Eq. 8}]$$

where, $n'_{xp}$ is $$n'_{xp} = \frac{L_p}{\int_0^{L_p} n_x^{-1} dy} \quad [\text{Eq. 9}]$$

As understood from Eq. 8, $n_{xav}$ can be expressed with $V_{gs}$ by expressing $n'_{xp}$ and $n_{xc}$ with $V_{gs}$. Therefore, first of all, we express $n'_{xp}$ and $n_{xc}$ by $V_{gs}$.

Assume that $Q_{inv}$ is charge density per unit area of the inversion layer electrons; we have $$n_x = \frac{Q_{inv}}{q}$$

Note that $Q_{inv}$ is expressed by:

$$Q_{inv} = Q_s - Q_{dep} \quad [\text{Eq. 10}]$$

where, $Q_s$ denotes electric charge per unit area which is collected on a bulk side and $Q_{dep}$ the electron density (i.e. accepter density in the depletion layer) per unit area. Assuming that bulk impurity concentration is constant, $Q_{dep}$ can be analytically obtained. By substituting the obtained value into Eq. 9, $n_x$ is expressed as $$n_x = \sqrt{\frac{2N_{sub}\varepsilon_{si}}{q\beta}} \quad [\text{Eq. 11}]$$

$$\left( \sqrt{\beta(\phi_s - V_{bs}) - 1 + \left(\frac{n_i}{N_{sub}}\right)^2 \exp(\beta\phi_s)} - \sqrt{\beta(\phi_s - V_{bs}) - 1} \right)$$

where, $N_{sub}$ is homogeneous impurity concentration of the substrate. Under the threshold value conditions, it is assumed that $$\left(\frac{n_i}{N_{sub}}\right)^2 (\beta(\phi_s - V_{bs}) - 1) \ll 1 \text{ and } \exp(-\beta\phi_2) \ll 1,$$

these terms are omitted. As understood from Eq. 11, $n_x$ can be calculated when a value of $\phi_s$ is obtained. Because $V_{gs}$ is in the vicinity of $V_{th}$, let $$\left(\frac{n_i}{N_{sub}}\right)^2 \exp(\beta\phi_2) \ll \beta(\phi_s - V_{bs}) - 1$$

and perform Taylor expansion to first order term around $\phi_s = \phi_{s1}$; then, EQ. 11 which is the implicit function for $\phi_s$ can be described unequivocally as shown in Eq. 12.

$$n_x = \sqrt{\frac{N_{sub}\varepsilon_{si}}{q\beta}} \frac{\left(\frac{n_i}{N_{sub}}\right)^2 \exp(\beta\phi_s)}{\sqrt{2\beta(\phi_{s1} - V_{bs}) - 2}} \quad [\text{Eq. 12}]$$

where, $\phi_{s1}$ denotes potential that gives the threshold voltage. In the case with pocket implant, $V_{th}$ comes between that of the device with homogeneous $N_{subc}$ and that of the device with homogeneous $N_{subp}$. Thus, first of all, we assume with two homogeneous $N_{sub}$'s. $n_{xc}$ can be obtained by substituting $N_{sub}$ for $N_{subc}$ and $\phi_s$ for $\phi_{sc}$, and $\phi_{s1}$ for $\phi_{s1c}$, and we have $$n_{xc} = \sqrt{\frac{N_{sub}\varepsilon_{si}}{q\beta}} \frac{\left(\frac{n_i}{N_{subc}}\right)^2 \exp(\beta\phi_{sc})}{\sqrt{2\beta(\phi_{s1c} - V_{bs}) - 2}} \quad [\text{Eq. 13}]$$

where, $\phi_{sc}$ and $\phi_{s1c}$ denote an $\phi_s$ and $\phi_{s1}$ of the non-pocket-implant area. Similarly, $n_{xp}$ can be obtained by substituting $N_{sub}$ for $N_{subp}$, $\phi_s$ for $\phi_{sp}$, and $\phi_{s1}$ for $\phi_{s1c}$, and we have $$n_{xp} = \sqrt{\frac{N_{subp}\varepsilon_{si}}{q\beta}} \frac{\left(\frac{n_i}{N_{subp}}\right)^2 \exp(\beta\phi_{sp})}{\sqrt{2\beta(\phi_{s1p} - V_{bs}) - 2}} \quad \text{[Eq. 14]}$$

where, $\phi_{sp}$ and $\phi_{s1p}$ correspond to $\phi_s$ and $\phi_{s1}$ at the location with the highest substrate concentration of the pocket implant area, respectively.

$\phi_s$ can be calculated by the following relation (Eq. 15) resulting from the fact that the electric charges collecting on the electrode side of the gate oxide film are equal to $Q_s$ in the semiconductor determined by $\phi_s$:

$$C_{0x} = (V_{gs} - V_{fb} - \phi_s) \quad \text{[Eq. 15]}$$
$$= \sqrt{\frac{2qN_{sub}\varepsilon_{si}}{\beta}} \sqrt{\beta(\phi_s - V_{bs}) - 1 + \left(\frac{n_i}{N_{sub}}\right)^2 \exp(\beta\phi_s)}$$

Since it is unable to analytically solve $\phi_s$ for Eq. 15, $\phi_s$ is expressed by using approximation.

First of all, in order to apply approximation to the vicinity of the threshold value, we assume:

$$\left(\frac{n_i}{N_{sub}}\right)^2 \exp(\beta\phi_s) << \beta(\phi_s - V_{bs}) - 1$$

Furthermore, by performing Taylor expansion for square root terms in the equation to first order term around $\phi_{s1}$ and rearranging, we have $$\phi_s = V_{gs} - V_{fb} + A - \sqrt{A}\sqrt{2V_{gs} - 2V_{fb} - 2V_{bs} + A}$$

where, A denotes $$A = \frac{qN_{sub}\varepsilon_{si}}{C_{0x}^2}$$

$\phi_{sc}$ can be obtained by replacing $N_{sub}$ for $N_{subc}$ by $$\phi_{sc} = V_{gs} - V_{fb} + A_c - \sqrt{A_c}\sqrt{2V_{gs} - 2V_{fb} - 2V_{bs} + A_c} \quad \text{[Eq. 17]}$$

where, $A_c$ is given by $$A_c = \frac{qN_{subc}\varepsilon_{si}}{C_{0x}^2}$$

Similarly, $\phi_{sp}$ can be obtained by replacing $N_{sub}$ for $N_{subc}$ by $$\phi_{sp} = V_{gs} - V_{fb} + A_p - \sqrt{A_p}\sqrt{2V_{gs} - 2V_{fb} - 2V_{bs} + A_p} \quad \text{[Eq. 18]}$$

where, $A_p$ is given by $$A_p = \frac{qN_{subp}\varepsilon_{si}}{C_{0x}^2}$$

In addition, since the threshold value obtained in the case the channel length is long, is adopted as a reference value, $\phi_{s1}$ is $V_{gs}$ when $N_{sub}$ is $N_{subc}$, and Eq. 1 is applied to the homogeneous device.

By using $$V_{thc} = 2\phi_{Bc} + V_{fb} + \frac{\sqrt{2qN_{subc}\varepsilon_{si}(2\phi_{Bc} - V_{bs})}}{C_{0x}}, \quad \text{[Eq. 19]}$$

we have $$\phi_{s1} = V_{thc} - V_{fb} + A - \sqrt{A}\sqrt{2V_{thc} - 2V_{fb} - 2V_{bs} + A},$$

where, $$\phi_{Bc} = \frac{1}{\beta}\ln\left(\frac{N_{subc}}{n_i}\right) \quad \text{[Eq. 20]}$$

From Eq. 20, $\phi_{s1c}$ and $\phi_{s1p}$ are respectively expressed as follows:

$$\phi_{s1c} = V_{thc} - V_{fb} + A_c - \sqrt{A_c}\sqrt{2V_{thc} - 2V_{fb} - 2V_{bs} + A_c} \quad \text{[Eq. 21]}$$

$$\phi_{s1p} = V_{thc} - V_{fb} + A_p - \sqrt{A_p}\sqrt{2V_{thc} - 2V_{fb} - 2V_{bs} + A_p} \quad \text{[Eq. 22]}$$

Up to this point, $n_{xc}$ and $n_{xp}$ are obtained. Next, $n'_{xp}$ will be obtained for $n_{xav}$. Because the term on which $n_x$ is most greatly dependent on $N_{sub}$ is $N_{sub}^{-2}$, let $n_x$ be proportional to $N_{sub}^{-2}$ and integrate $n_x^{-1}$ by $0 \leq y \leq L_p$ with $n_{x(y=0)}=n_{xp}$, $n_{x(y=Lp)}=n_{xc}$ used as boundary conditions, and find the reciprocal; then $n'_{xp}$ is expressed by $$n'_{xp} = \frac{3n_{xc}}{\frac{n_{xc}}{n_{xp}} + \sqrt{\frac{n_{xc}}{n_{xp}} + 1}} \quad \text{[Eq. 23]}$$

Up to this point, $n_{xav}$ can be expressed as a function of $V_{gs}$.

Second Step:

Next, the equation to obtain $V_{gs}$ for $n_{xav}$ will be deduced. Initially, in logarithmic scale as observed in FIG. 5, $n_{xp}$ and $n_{xc}$ become nearly parallel in the vicinity of $V_{thc}$. Consequently, $$\frac{n_{xc}}{n'_{xp}}$$

is handled as a constant. Transforming the formula of $n_{xav}$ of Eq. 8, we have $$n_{xc} = \frac{L_{ch} + 2L_p\left(\frac{n_{xc}}{n'_{xp}} + 1\right)}{L_{ch}} n_{xav} \quad \text{[Eq. 24]}$$

Solving Eq. 13 for $\phi_{sc}$ and substituting Eq. 24, we obtain $$\phi_{sc} = \frac{1}{\beta}\ln\left(\frac{\left(L_{ch} + 2L_p\left(\frac{n_{xc}}{n'_{xp}} + 1\right)\right)\frac{n_{xav}}{L_{ch}}\sqrt{2\beta(2\phi_{Bc} - V_{bs}) - 2}}{\sqrt{\frac{N_{subc}\varepsilon_{si}}{q\beta}}\left(\frac{n_i}{N_{subc}}\right)^2}\right) \quad \text{[Eq. 25]}$$

Similarly, by solving Eq. 17 for $V_{gs}$, we can obtain $$V_{gs} = \frac{\phi_{sc} + V_{fb} - A_c + \sqrt{A_c}\left(\sqrt{2V_{thc} - 2V_{fb} - 2V_{bs} + A_c} - \dfrac{V_{thc}}{\sqrt{2V_{thc} - 2V_{fb} - 2V_{bs} + A_c}}\right)}{1 - \sqrt{\dfrac{A_c}{2V_{thc} - 2V_{fb} - 2V_{bs} + A_c}}} \quad [\text{Eq. 26}]$$

Third Step:

Lastly, let $n_{xav}=n_{xth}$, then $V_{th}$ can be obtained. $V_{th}$ and $\phi_{th}$ are expressed as follows:

$$V_{th} = \frac{\phi_{th} + V_{fb} - A_c + \sqrt{A_c}\left(\sqrt{2V_{thc} - 2V_{fb} - 2V_{bc} + A_c} - \dfrac{V_{thc}}{\sqrt{2V_{thc} - 2V_{fb} - 2V_{bs} + A_c}}\right)}{1 - \sqrt{\dfrac{A_c}{2V_{thc} - 2V_{fb} - 2V_{bs} + A_c}}} \quad [\text{Eq. 27}]$$

$$\phi_{th} = \frac{1}{\beta}\ln\left(\frac{\left(L_{ch} + 2L_p\left(\dfrac{N_{xc}}{n'_{xp}} - 1\right)\right)\dfrac{n_{xth}}{L_{ch}}\sqrt{2\beta(2\phi_{Bc} - V_{bs}) - 2}}{\sqrt{\dfrac{N_{subc}\varepsilon_{si}}{q\beta}}\left(\dfrac{n_i}{N_{subc}}\right)^2}\right) \quad [\text{Eq. 28}]$$

where, $\phi_{th}$ is surface potential that gives a threshold value condition. The same formula can be obtained for P-channel. However, in such event, the absolute value of the threshold voltage is given.

(4) Simplification of Model

In the above model, pocket penetration length $L_p$ and maximum concentration of pocket $N_{subp}$ are used. Analytically found $V_{th}$ is of a complicated expression, and is not suitable for use in circuit simulation. Therefore, simplification of the model is required.

Now, the concentration $N_{sub}$ averaged in the channel direction is introduced and a constant concentration profile in the channel direction will be assumed. Consequently, in such event, it means that $L_{ch}=L_p$ and $n_{xc}=n'_{xp}$ are set.

As a result, [Eq. 28] is simplified as follows:

$$\phi_{th} = \frac{1}{\beta}\ln\left(\frac{n_{xth}\sqrt{2\beta(2\phi_B - V_{bs}) - 2}}{\sqrt{\dfrac{N_{sub}\varepsilon_{si}}{q\beta}}}\right) + \frac{2}{\beta}\ln\left(\frac{N_{sub}}{n_i}\right) \quad [\text{Eq. 29}]$$

Approximating the above expression allowing errors within maximum 10% or so, we have $$\phi_{th} \approx \frac{1}{\beta}\ln\left(\frac{N_{sub}}{N_i}\right). \quad [\text{Eq. 30}]$$

Further, by using $$V_{th} = \phi_{th} + V_{fb} - Ac + \quad [\text{Eq. 31}]$$
$$\sqrt{Ac} \cdot \sqrt{2V_{th} - 2V_{fb} - 2V_{bs} + Ac},$$
$$Ac = \frac{qN_{sub}\varepsilon_{si}}{C_{0x}^2}$$

to obtain $V_{th}$, we have $$V_{th} = \phi_{th} + V_{fb} + \frac{\sqrt{2qN_{sub}\varepsilon_{si}(\phi_{th} - V_{bs})}}{C_{0x}} \quad [\text{Eq. 32}]$$

and the model can be satisfactorily simplified.

(5) Reproduction of the Depth-Direction Profile

The threshold voltage model is homogeneous in the depth direction. That is, it is assumed that the profile does not change in the depth direction. Though the obtained threshold voltage satisfactorily produces the actual measurement, the profile is practically expected to change in the depth direction. By the following processing, the profile in the depth direction can be acquired.

First Step:

In $V_{th}$-$L_{gate}$ characteristics measured actually, the substrate concentration $N_{subc}$ is determined based on one or more values when $L_{gate}$ is comparatively large.

Second Step:

In $V_{th}$-$L_{gate}$ characteristics measured actually, the maximum pocket concentration $N_{subp}$ and the penetration length $L_p$ are determined based on one or more values when $L_{gate}$ is medium. Since these two values cannot be determined unequivocally, optimal values of $N_{subp}$ and $L_p$ to fit to the actually measured $V_{th}$ are chosen.

Third Step:

In $V_{th}$-$L_{gate}$ characteristics measured actually, short-channel parameters are determined based on one or more values when $L_{gate}$ is comparatively small. The short-channel parameters are introduced in the papers: IEEE Trans. CAD/ICAS, vol. 15, p. 1–7, 1996, M. Miura-Mattausch et al., and Proc. SISPAD, p. 207, 1999, M. Suetake et al., and used for modeling the threshold voltage with so-called short-channel effect taken into account.

Fourth Step

The first to the third steps are repeated until the consistent results are obtained.

Note that the first to the fourth steps are carried out at $V_{bs}$ (bulk voltage)=0.

Fifth Step

By using $V_{th}$–$L_{gate}$ characteristics when $V_{bs}\neq 0$, a profile in the depth direction can be known in compliance with the method of SISPAD99.

The above papers are incorporated herein by reference, and thus, detail explanation of the method are omitted. Briefly, in principle, it could be described as follows.

Figure 6:
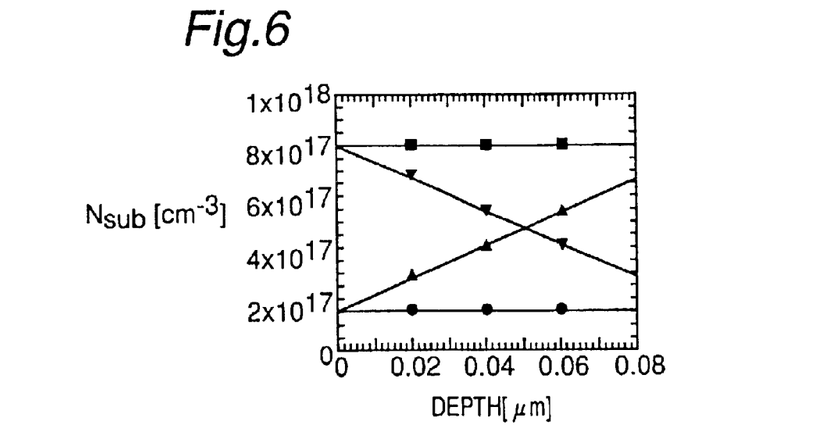
FIG. 6 is a graph of a concentration profile in the substrate depth direction.
Figure 7:
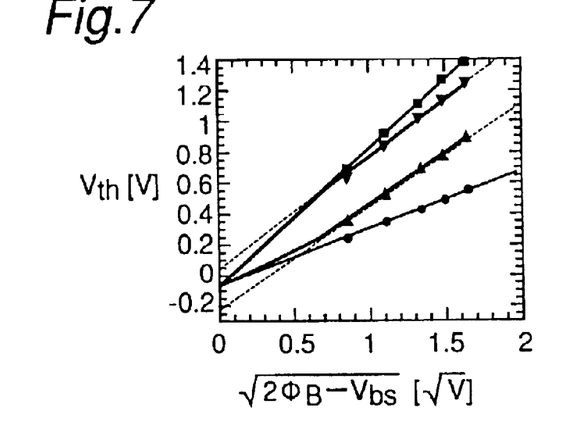
FIG. 7 is a graph of a relationship between $V_{th}$ and $\sqrt{2\phi_{B-V_{bs}}}$.

In the case four kinds of profiles as shown in FIG. 6 are chosen for the concentration profiles in the depth direction, characteristics of $$V^{th}-\sqrt{2\phi_{B-V_{bs}}}$$

are derived by means of the 2D device simulator to obtain characteristics shown in FIG. 7. Note that $2\phi_B$ is a potential that defines the threshold value condition and $V_{bs}$ is the substrate voltage. As shown in this figure, when the concentration is constant, the profile becomes a complete straight line. On the other hand, when concentration of the profile is gradient, the profile deviates from the straight line in the range of $V_{bs}=0$ or lower when the profile is linearly extrapolated. Consequently, if the deviation of the segment at $(2\phi_B-V_{bs})=0$ is obtained, it is possible to determine the profile in the depth direction based on the deviation.

In the case in which the profile may represent a quadratic curve, the above explanation can be extended to the second order.

(6) Verification

<Reproduction of the Measured Value>

Figure 8:
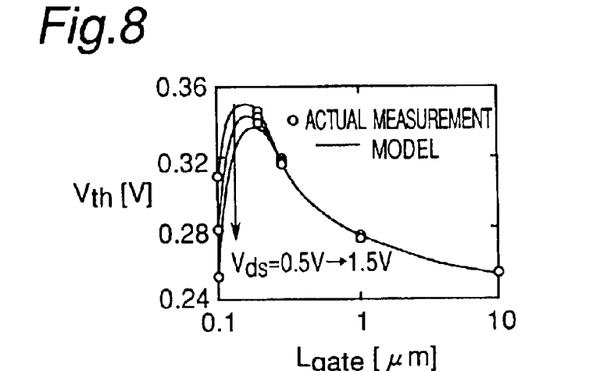
FIG. 8 is a diagram showing that $V_{th}$ obtained by the simulation can be reproduced by the threshold voltage model according to the present invention.

In this part of the section, the results up to the fourth step will be verified. First of all, the mode is fitted to $V_{th}$ found by the two-dimensional device simulation, which is shown in FIG. 8. For this simulation, a profile found by the two-dimensional process simulation is used so that the actually measured threshold voltage is reproduced. In addition, the short-channel effect model is added to calculated value of the model in order to incorporate the short-channel effect. The reason why $V_{ds}$ is adopted for a parameter in this fitting operation is to adjust the parameter of short-channel effect.

<Reproduction of the Profile>

Figure 9:
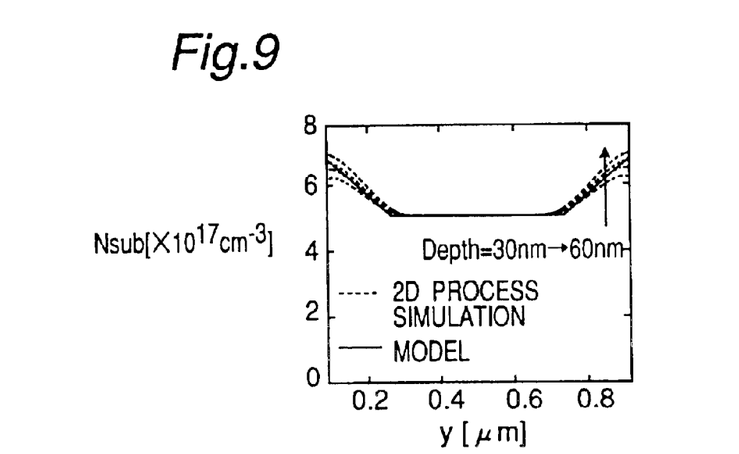
FIG. 9 is a diagram of comparison between the profile obtained by using the present model and a profile used for the simulation.

FIG. 9 shows comparison between the profile drawn by parameters $L_p$ and $N_{subp}$ obtained by the fitting operation of the preceding section and the profile used for device simulation. The profile obtained by fitting operation well coincide with the profile of 40 nm depth used for simulation.

As observed in these figures, coincidence of both $V_{th}$s results in coincidence of both profiles, indicating the satisfactory modeling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for calculating a threshold voltage of pocket implant MOSFET in a semiconductor device comprising steps of:

obtaining an approximated profile by using penetration length of a pocket penetrating into a substrate in a channel direction and maximum impurity concentration in the pocket as parameters to linearly approximate a profile of impurity concentration within the substrate in the channel direction;

predicting the threshold voltage based on the approximated profile obtained; and analytically solving a model of the threshold voltage to obtain the threshold voltage under a condition in which the threshold voltage is obtained by integrating density of electric charges in an inversion layer over a whole channel area when the density of electric charges in the inversion layer reaches a predetermined threshold value.

2. The method calculating the threshold voltage according to claim 1, wherein the approximated profile is a profile of impurity concentration in which the impurity concentration descends in a straight line from $N_{subp}$ to $N_{subc}$ in a first end range within $L_p$ in the channel direction from a source side end, the impurity concentration keeps constant of $N_{subc}$ in a center range of $L_{ch}-2L_p$, and the impurity concentration rises in a straight line from $N_{subp}$ to $N_{subc}$ in a second end range within $L_p$ from the drain side end, where $L_{ch}$ denotes channel length, $2L_p$ the penetration length, $N_{subp}$ the maximum impurity concentration, and $N_{subc}$ the impurity concentration of the substrate.

3. A method for calculating a threshold voltage of pocket implant MOSFET in a semiconductor device comprising steps of:

obtaining an approximated profile by using penetration length of a pocket penetrating into a substrate in a channel direction and maximum impurity concentration in the pocket as parameters to linearly approximate a profile of impurity concentration within the substrate in the channel direction; and predicting the threshold voltage based on the approximated profile obtained wherein the approximated profile is a profile of impurity concentration in which the impurity concentration descends in a straight line from $N_{subp}$ to $N_{subc}$ in a first end range within $L_p$ in the channel direction from a source side end, the impurity concentration keeps constant of $N_{subc}$ in a center range of $L_{ch}-2L_p$, and the impurity concentration rises in a straight line from $N_{subp}$ to $N_{subc}$ in a second end range within $L_p$ from the drain side end, where $L_{ch}$ denotes channel length, $2L_p$ the penetration length, $N_{subp}$ the maximum impurity concentration, and $N_{subc}$ the impurity concentration of the substrate.

4. A circuit simulation method for providing threshold voltage of pocket implant MOSFET, comprising steps of:

obtaining an approximated profile by using penetration length of a pocket penetrating into a substrate in the channel direction and an average value of a profile of impurity concentration in the channel direction as parameters to approximate a profile of the impurity concentration within the substrate in the channel direction;

predicting the threshold voltage based on the approximated profile obtained; and analytically solving the approximated profile to obtain the threshold voltage under a condition in which the threshold voltage is obtained by integrating density of electric charges in an inversion layer over a whole channel area when the density of electric charges in the inversion layer reaches a predetermined threshold value.

5. A method for calculating a threshold voltage of pocket implant MOSFET in a semiconductor device comprising steps of:

providing a model of threshold voltage, which has a profile of inhomogeneous impurity concentration in a channel direction;

analytically solving the model of the threshold voltage to obtain the threshold voltage under a condition in which the threshold voltage is obtained by integrating density of electric charges in an inversion layer over a whole channel area when the density of electric charges in the inversion layer reaches a predetermined threshold value.

6. The method for calculating the threshold voltage of pocket implant MOSFET according to claim 5, further comprising a step of defining the model of threshold voltage by using penetration length of a pocket penetrating into a substrate in the channel direction and maximum impurity concentration in the pocket as parameters.

7. The method for calculating the threshold voltage of pocket implant MOSFET according to claim according to claim 6, wherein the model of threshold voltage has the profile of impurity concentration in which the impurity concentration descends in a straight line from $N_{subp}$ to $N_{subc}$ in a first end range within $L_p$ in the channel direction from a source side end, the impurity concentration keeps constant of $N_{subc}$ in a center range of $L_{ch}-2L_p$, and the impurity concentration rises in a straight line from $N_{subp}$ to $N_{subc}$ in a second end range within $L_p$ from the drain side end, where $L_{ch}$ denotes channel length, $2L_p$ the penetration length, $N_{subp}$ the maximum impurity concentration, and $N_{subc}$ the impurity concentration of the substrate.

8. The method for calculating the threshold voltage of pocket implant MOSFET according to claim 5, further comprising a step of linearly approximating the profile of inhomogeneous impurity concentration by using penetration length of a pocket penetrating into a substrate in the channel direction and maximum impurity concentration in the pocket as parameters.

9. A method for calculating a threshold voltage of pocket implant MOSFET in a semiconductor device by means of a predetermined model comprising steps of:

obtaining a profile of impurity concentration by using penetration length of a pocket penetrating into a substrate in a channel direction and maximum impurity concentration in the pocket as parameters to linearly approximate a profile of impurity concentration within the substrate in the channel direction;

adopting the profile of impurity concentration linearly approximated as the predetermined model; and obtaining the threshold voltage under a condition in which the threshold voltage is obtained by integrating density of electric charges in an inversion layer over a whole channel area when the density of electric charges in the inversion layer reaches a predetermined threshold value.

10. A method for calculating a threshold voltage of pocket implant MOSFET in a semiconductor device by means of a predetermined model comprising steps of:

obtaining a profile of impurity concentration by using penetration length of a pocket penetrating into a substrate in a channel direction and maximum impurity concentration in the pocket as parameters to linearly approximate a profile of impurity concentration within the substrate in the channel direction;

adopting the profile of impurity concentration linearly approximated as the predetermined model;

linearly approximating the profile of impurity concentration within the substrate in the channel direction by using the parameters; and obtaining the threshold voltage under a condition in which the threshold voltage is obtained by integrating density of electric charges in an inversion layer over a whole channel area when the density of electric charges in the inversion layer reaches a predetermined threshold value.

* * * * *

UNITED STATES PATENT AND TRADEMARK OFFICE
CERTIFICATE OF CORRECTION

PATENT NO. : 6,909,976 B2
DATED : June 21, 2005
INVENTOR(S) : Daisuke Kitamaru et al.

It is certified that error appears in the above-identified patent and that said Letters Patent is hereby corrected as shown below:

Title page,
Item [56], References Cited, OTHER PUBLICATIONS, "Mirua-Mattausch" reference, please change "Mirua-Mattausch et al., IEEE Transactions on Electron" to -- Miura-Mattausch et al., IEEE Transactions on Electron --.

Signed and Sealed this

Twenty-second Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,909,976 B2
DATED : June 21, 2005
INVENTOR(S) : Daisuke Kitamaru et al.

It is certified that error appears in the above-identified patent and that said Letters Patent is hereby corrected as shown below:

Column 1,
Lines 30 and 42, a period is missing after the word "MOSFET".

Column 3,
Line 42, a period is missing after the word "MOSFET".

Column 4,
Line 16, replace "in" with -- ln --.

Column 7,
Line 53, replace "φspcan" with -- $\varphi_{sp}$ can --.

Signed and Sealed this

Twentieth Day of December, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,909,976 B2 |
| APPLICATION NO. | : 10/231117 |
| DATED | : June 21, 2005 |
| INVENTOR(S) | : Daisuke Kitamaru et al. |

It is certified that error appears in the above-identified patent and that said Letters Patent is hereby corrected as shown below:

Column 1,
Line 9, add -- a -- before "pocket".
Line 13, replace "Transistor" with -- Transistors --.
Line 16, add -- a -- before "concentration".
Line 18, add -- same -- before "type".
Line 18, delete "same" after "type".
Line 19, add -- a -- before "gate".

Column 2,
Line 20, replace "It" with -- it --.
Line 64, add -- a -- before "pocket".

Column 3,
Line 19, replace "of" with -- thereof --.
Line 23, add -- a -- before "pocket".

Column 5,
Line 34, add -- have -- after "implant".
Lines 38-39, delete "$V_{th}$", (second occurrence).

Column 6,
Line 34, add -- and -- before "these".

Column 11,
Line 6, add -- detailed -- before "explanation".

Column 12,
Line 7, add -- for -- before "calculating".

UNITED STATES PATENT AND TRADEMARK OFFICE
CERTIFICATE OF CORRECTION

PATENT NO. : 6,909,976 B2
APPLICATION NO. : 10/231117
DATED : June 21, 2005
INVENTOR(S) : Daisuke Kitamaru et al.

It is certified that error appears in the above-identified patent and that said Letters Patent is hereby corrected as shown below:

Column 13,
Line 13, delete "according to claim", (second occurrence).

Signed and Sealed this

Eleventh Day of July, 2006

JON W. DUDAS
*Director of the United States Patent and Trademark Office*